(12) United States Patent
Pigott et al.

(10) Patent No.: US 11,391,544 B2
(45) Date of Patent: Jul. 19, 2022

(54) DEVICE FOR LOCATING, SHARING, AND ENGAGING TARGETS WITH FIREARMS

(71) Applicant: P2K Technologies, LLC, Orlando, FL (US)

(72) Inventors: Dane Stephens Pigott, Oldsmar, FL (US); Westin Riggs Pigott, Carmel, IN (US); Babak Hossein Keradman, St. Petersburg, FL (US)

(*) Notice: Subject to any disclaimer, the term of this patent is extended or adjusted under 35 U.S.C. 154(b) by 0 days.

(21) Appl. No.: 16/817,166

(22) Filed: Mar. 12, 2020

(65) Prior Publication Data

US 2020/0363160 A1 Nov. 19, 2020

Related U.S. Application Data

(60) Provisional application No. 62/817,272, filed on Mar. 12, 2019.

(51) Int. Cl.
| | |
|---|---|
| *F41G 1/46* | (2006.01) |
| *F41G 11/00* | (2006.01) |
| *F41G 3/16* | (2006.01) |
| *F41G 3/08* | (2006.01) |
| *F42B 5/28* | (2006.01) |
| *F42B 12/64* | (2006.01) |
| *F42C 9/10* | (2006.01) |

(52) U.S. Cl.
CPC ............ *F41G 1/46* (2013.01); *F41G 3/08* (2013.01); *F41G 3/165* (2013.01); *F41G 11/001* (2013.01); *F42B 5/28* (2013.01); *F42B 12/64* (2013.01); *F42C 9/10* (2013.01)

(58) Field of Classification Search
CPC ... F41G 1/46; F41G 3/08; F41G 3/165; F41G 11/001; F41G 3/02; F41G 3/06; G01S 17/86; G01S 17/89
See application file for complete search history.

(56) References Cited

U.S. PATENT DOCUMENTS

| | | | |
|---|---|---|---|
| 4,949,089 A * | 8/1990 | Ruszkowski, Jr. | F41G 3/06 342/52 |
| 6,449,892 B1 * | 9/2002 | Jenkins | F41A 17/066 42/1.01 |
| 10,048,039 B1 * | 8/2018 | Bell | B64C 39/024 |
| 2008/0160486 A1 * | 7/2008 | Tengblad | F41G 3/2644 434/19 |
| 2009/0266892 A1 * | 10/2009 | Windauer | F41G 1/40 235/404 |
| 2012/0019522 A1 * | 1/2012 | Lawrence | G06T 17/00 345/419 |
| 2012/0118955 A1 * | 5/2012 | Cox | F41G 3/06 235/404 |
| 2014/0110482 A1 * | 4/2014 | Bay | F41G 1/44 235/404 |
| 2016/0091282 A1 * | 3/2016 | Baker | F41G 3/02 348/158 |

(Continued)

*Primary Examiner* — Joshua E Freeman
(74) *Attorney, Agent, or Firm* — Thomas Stanton; Joel Douglas

(57) ABSTRACT

The invention relates to a system to increase the effectiveness of direct fire weapon systems in targeting and destroying a target utilizing the military's existing direct fire weapon systems. The invention consists of a network which communicates with the devices of the invention and that are capable of directing the fire to a specific location.

17 Claims, 12 Drawing Sheets

(56) References Cited

U.S. PATENT DOCUMENTS

2016/0163080 A1* 6/2016 Baker ................... F41G 3/08
                                                      345/632
2019/0003804 A1* 1/2019 Deng .................... F41G 3/04
2020/0117900 A1* 4/2020 Deng .................... H04W 4/02

* cited by examiner

DEVICE FOR LOCATING, SHARING, AND ENGAGING TARGETS WITH FIREARMS

CROSS-REFERENCE TO RELATED APPLICATION

This application claims priority from U.S. Provisional Patent Application No. 62/817,272, filed Mar. 12, 2019, titled DETERRENT FOR UNMANNED AERIAL SYSTEMS which is hereby incorporated by reference herein for all purposes.

COPYRIGHT STATEMENT

Trademarks used in the disclosure of the invention and the applicants make no claim to any trademarks referenced.

BACKGROUND OF THE INVENTION

1) Field of the Invention

The invention relates to a system to increase the effectiveness of direct fire weapon systems in targeting and destroying a target utilizing the military's existing direct fire weapon systems. The invention consists of a network which communicates with the devices of the invention and that is capable of directing fire to a specific location and target.

2) Description of Related Art

It is well understood that a firearm cannot consistently hit a target, even when that target is lined up with the weapon's sighting system, without adjusting for external conditions referred to as ballistics, such as bullet drop, target velocity, range to target, bullet flight time, wind, bullet shape and weight, air pressure, temperature, spindrift, angle to the target (called "cosine angle"), either up or downhill, and others. The ballistics are simpler when the distances are shorter and most shooters who engage in short to regular ranges usually only have to adjust their sights to compensate for gravity but when the range is extended, ballistic factors come into play. These issues are compounded when there is a need to coordinate fire from multiple sources at one or more targets, a problem that is replete in modern warfare. The targets in many situations include more than one target, including targets that are mobile such as unmanned or radio-controlled vehicles that are controlled remotely by an operator using a radio transmitter or other wireless communication technology, and vehicles and other air borne targets such as low flying planes and helicopters. The unmanned or radio-controlled vehicles include devices such as Unmanned Aerial Vehicles (UAS) and small Unmanned Aerial Vehicles (sUAS).

There is a need for a simple system to assist a shooter when engaged in distance shots to calculate ballistics.

When there is more than one shooter there is a need to coordinate the fire from all positions and currently there is not a low-cost and effective system which allows shooters from distal positions to target and coordinate fire on one or more targets.

There is a need for a simple defensive weapon system capable of coordinating fire between multiple weapons and multiple targets that utilizes rifles such as a M16 and M4, and machines guns such as a M249, M240 and M2 which are standard issue weapons and foreign weapons for all U.S. military troops.

BRIEF SUMMARY OF THE INVENTION

The embodiment in one form is directed to a device and system which consists of multiple electromechanical sensors, information transmission systems, one or more visual displays, and related electronic components. The device is capable of being mounted to a wide variety of weapons systems such as a M16 and M4, and machines guns such as a M249, M240 and M2, and is configured to provide target information to the weapon.

The embodiment's electromechanical sensors are utilized for three purposes: determination of the location of the target or targets, orientation which is the pitch, roll and yaw of the device, and atmospheric conditions such as temperature, pressure and wind velocity and direction.

The embodiment in another form is directed to an effective defense against Unmanned Aerial Vehicles (UAS) and small Unmanned Aerial Vehicles (sUAS) that is designed to utilize current direct fire weapons in the military arsenal rifles such as a M16 and M4, and machines guns such as a M249, M240 and M2.

The invention in another form is directed to a targeting system device that attaches to weapons systems to help direct accurate fire against the UAS and sUAS.

An advantage of the present embodiment is that it utilizes the orientation, location, range to target, and rate of change of the data to accurately locate the target in space and determine its velocity relative to the Earth. This information provides the shooter with the intersection point of target with a predicted trajectory path of the weapon. Also, when two or more separate devices are targeting the same target the system can utilize their location and orientation data to determine target location and velocity.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the device and such exemplifications are not to be construed as limiting the scope of the device in any manner.

DETAILED DESCRIPTION

Figure 1:
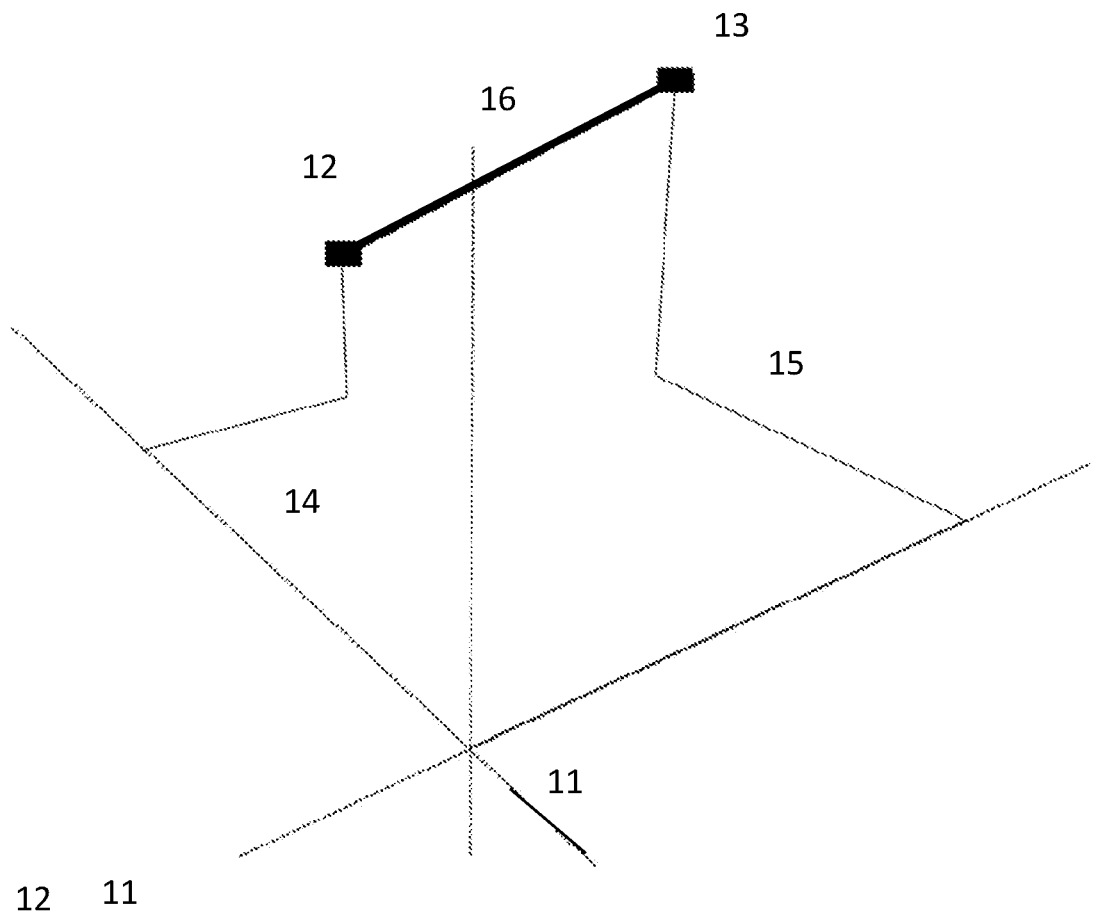
FIG. 1 shows an embodiment when utilizing two or more Differential Global Navigation Satellite Systems (GNSS) antennas to determine Pitch and Yaw.

The term user, individual, shooter, war fighter and person as used in this specification are used interchangeably to mean an individual using the system including any sensors, devices, weapons or base station connected to the system of an embodiment of the invention. The term sUAS and UAS as used in this specification are used interchangeably to mean Unmanned Aerial Systems.

The term network as used in this specification includes mesh networks such as Zigbee, Thread, Bluetooth mesh, Z-Wave, Bluetooth networks, WIFI networks and other wired and wireless networks.

The term mesh network as used in this specification means a mesh network (or simply meshnet) and refers to a local network topology in which the infrastructure nodes (i.e. bridges, switches, and other infrastructure devices) connect directly, dynamically, and non-hierarchically to as many other nodes as possible and cooperate with one another to efficiently route data from/to clients.

The term device as used in this specification refers to a device on the network or on a weapon having a networked device. The primary device is the system component that has an onboard computer that communicates with sensors and determines the location, ballistics, orientation, atmospherics, and other conditions and information needed to arrive at an accurate ballistic intercept solution to be displayed for the user to direct their weapon to shoot a target.

The term displayed on a display of the device is used within the specification to also mean automated firing system such as robotics or electrical mechanical weapons firing platform.

The terms device, invention, and system are used interchangeably within the specification to mean an embodiment of the present invention.

A preferred embodiment of the device is a computer system and network which comprises two or more sensor units mounted on firearms or other equipment such as cameras. An on-board computer runs a program to determine target coordinates and provides communication with an optional network. However, higher accuracy is obtained by mounting two sensor units to the same weapon. Therefore, each device is capable of designating targets, engaging targets, or both. When locating a target, the operator of the system visually sights the target. This is accomplished by either an internal optic or camera or by way of an optic, camera, or other weapon sight that is attached to the weapon or device. Once the operator locates the target, they follow it visually. The device uses a laser range finder or other distance measurement sensor to determine the range to the target. The system may also have a camera system with software to help more accurately follow the target. The device uses multiple microelectromechanical sensor systems to accurately determine the device's location and orientation relative to the earth. The device utilizes the orientation, location, range to target, and rate of change of the data to accurately locate the target in space an determine its velocity relative to the earth. Additionally, an embodiment of the device can be configured such that two devices pointing at the same target can utilize their location and orientation data alone to determine target location and velocity, without the aid of distance sensors.

Once a device has the target located and tracked, the device transmits that information to other nearby devices using either an internal radio system or by sending data via wires or wirelessly to an external radio or other data transmission system such that all data is equally shared by all the devices.

When a device receives targeting information, the device can then calculate the most appropriate orientation of the device and attached weapon such as, an M16 and M4, machines guns such as M249, M240 and M2, in order to shoot the target based on the device location and velocity and target location and velocity. This feature is especially useful when the target is a moving object such as an Unmanned Aerial Vehicles (UAS) and small Unmanned Aerial Vehicles (sUAS).

The device may also take into account various ballistic variables such as bullet drop, target velocity, range to target, bullet flight time, wind, bullet shape and weight, air pressure, temperature, spindrift, angle to the target (called "cosine angle"), either up or downhill and others. the specific weapon type, ammunition, gun barrel temperature and other environmental factors which affect the bullet as it flies to the target. Once the device of an embodiment computes the orientation needed, it displays to the operator, via a screen or other interface, such as an automated firing system such as robotics or electrical mechanical weapons firing platform, where to point their weapon and when to shoot in order to hit the target. Alternatively, the device can be used with or without a weapon to direct the operator where to look to see a target which has been located by another device. This is a feature which is useful for those individual war fighters providing forward observer missions.

Specifically, the embodiment is based in part on the realization that a firearm cannot consistently hit a target, even when that target is lined up with the weapon's sighting system, without adjusting for external conditions such as bullet drop, target velocity, range to target, bullet flight time, wind and other factors. Very long shoots such as those performed by snipers will also take into account the rotational effect of the earth known as the Coriolis effect.

Based upon this insight, the device solves the problem of aiming a weapon by a user of an embodiment of the invention and shooting the weapon at the target per the information displayed so that the bullet, when traveling, has an increased chance of hitting the target. This provides the individual or individuals using device an advantage over those individuals not using the invention because a shooter can do everything correctly but if they miscalculate one factor then they increase the probability that they will miss the target. The issues are further amplified when the target is moving.

An embodiment of the invention is a device which consists of an on-board computer processor, multiple sensors, information transmission systems, one or more visual displays and/or automated firing system such as robotics or electrical mechanical weapons firing platform, and related electronic components. The device has a system to allow mounting to a wide variety of weapons systems. The on-board computer processor can be any processor that has the necessary communication and calculation processing capabilities.

The devices of on-board computer processor are equipped with one or more radio systems capable of sending and receiving data.

Data sent by the device's radio systems could include target information (location, velocity, as well as other attributes), device information (location, velocity, system status and other data), information needed for setup and maintenance of the radio network and encryption, as well as video, images, or other data. The use of a network is not mandatory as the device of an embodiment can be used in standalone format whereas the device is paired with its own sensors and weapon.

Data received by the device's radio includes all of the above as well as data which is used by the DGNSS system (called Real Time Correction Measures or RTCM).

The devices may use its internal radio connected to the board computer processor for these data transfers, or alternately could use an external radio connected via wire or wireless link, or a wired link to other devices or external data sources/users.

The devices are designed to communicate with multiple other devices during operation through the on-board computer processor. The invention anticipates a variety of devices such as weapon mounted devices for communication with the shooter, display for communicating with the shooter such as a video display, an indicator light panel, a voice command system or robotic interface or electromechanical firing platform, input devices for use by the shooter to communicate with the on-board computer and other devices on the network, base stations for distributed networking, communication gate ways to other networks, sensor stations for the collection and distribution of sensor data, weapon sensors for collection and distribution to the targeting systems of weapon data such as barrel temperature and other network components. The system sets up and creates a mesh network. A mesh network is a self-reinforcing network with no central hub. Any device in the network can send or receive data from/to any other device at any time. Devices may communicate data point to point (one device sending data to all devices directly) or through repeaters (a device receives data and rebroadcasts it, ensuring a more robust and wide-ranging network).

The device's electromechanical sensors are in communication with the device's on-board computer processor. The electromechanical sensors and computer, which may reside on the network or be indirectly communicating with the device associated with a specific weapon, are utilized for three purposes, to determine the location, orientation, and atmospherics or atmospheric conditions.

With respect to location, this refers to finding the location of the device relative to either the Earth, known points on or above the earth, or to other instances of the same device. These computerized systems are networked, and the device and the on-board computer processor can be utilized individually, or they can be used with more than one device as part of a system. The system can be used to increase accuracy or create redundancies. Specifically, the system can be used with location sensors including Differential Global Navigation Satellite Systems (DGNSS), Ultra-Wide band measurement sensors, Lidar Magnetic, solar, celestial positioning systems and Stadia distance measurement:

a. DGNSS—Differential Global Navigation Satellite Systems. These devices provide locations relative to the Earth (latitude and longitude) that are significantly more accurate than non-differential GNSS (regular GPS). DGNSS systems utilize radio data from satellites as well as correction data from an external source to obtain absolute (in reference to the Earth) accuracies of as small as 1 meter and relative (in reference to the correction data source and to other DGNSS antennas utilizing the same source) of as small as 2 cm.

b. Ultra-Wide band or other distance and speed measurement sensors determine distance and or speed to other devices, targets and other relevant objects, including other out-and-back radio systems, Light Detection and Ranging (LIDAR), ultrasonic, optical systems such as Stadia distance measurement and others. These devices provide distance measurements between the invention and other inventions, and between the invention and external known points. Thus, if there are more than 3 devices (or known points) that can measure from each other, relative (to each other) positions can be obtained for all instances of the invention through triangulation and geometry. If any of the inventions or known points also have an absolute (in reference to the Earth) location known, the absolute location of all the devices near it can be extrapolated.

c. Magnetic, solar, or celestial positioning systems. These systems utilize the Earth's magnetic field, the position of the sun, or the position of stars to inform the absolute (relative to Earth) position.

d. Stadia distance measurement techniques such as those found in rifle scopes.

With respect to orientation to determine the Pitch, Roll and Yaw of the device relative to the Earth and/or other devices the system computers and the device on-board computer processor of the instant invention can be used with Magnetometer, Gyroscope, Accelerometer and DGNSS:

a. Magnetometer, Gyroscope, Accelerometer. These systems, often combined into one system called an inertial measurement unit (IMU) help the device to know its Pitch, Roll and Yaw through direct measurement and algorithmic modeling. These systems can work individually, or more than one system or instance of a system can be used to increase accuracy or create redundancies.

b. DGNSS—Due to high relativistic accuracies (as small as 2 cm), 2 or more DGNSS antennas can be utilized to determine the Pitch, Roll and Yaw of the device through geometry.

c. Distance measurement sensors. Utilizing more than one distance measurement sensor for each device allows the device to determine its orientation (especially Pitch and Yaw) relative to other devices. If another device knows its absolute (relative to the Earth) pitch and yaw, the absolute Pitch and Yaw of both devices can be calculated.

With respect to atmospherics, the system computers and the device on-board computer processor can utilize atmospheric pressure sensors, air temperature sensors, wind speed sensors, wind direction sensors, humidity sensors, and atmospheric haze sensors:

a. air temperature sensor, such as a thermistor, measures the change in electrical resistance in response to changes in temperature; Resistance Temperature Detector (RTD) measures temperature by correlating the resistance of the RTD element with temperature; thermocouple, consists of two wires of different metals connected at two points and the varying voltage between these two points reflects proportional changes in temperature; and semiconductor-based temperature sensor is placed on integrated circuits (ICs). These sensors are effectively two identical diodes with temperature-sensitive voltage vs current characteristics that can be used to monitor changes in temperature.

b. Wind speed and direction sensor such as vane anemometer, thermal anemometer that include constant-temperature anemometer and constant-power anemometer, Light Detection and Ranging (Lidar), and cup anemometers.

c. Wind direction sensor such as wind vane sensors with a potentiometer, vane anemometer, thermal anemometer that include constant-temperature anemometer and constant-power anemometer Light Detection and Ranging (Lidar), and cup anemometers.

Referring now to the drawings, and more particularly to FIG. 1, there is shown an embodiment comprising of the system computers and the device on-board computer processor of the instant invention. When in use, the system utilizes two or more differential Global Navigation Satellite Systems (GNSS) antennas. When utilizing two or more GNSS antennas, the antennas are mounted to separate areas of the weapon (preferably in line with the barrel and as far apart as possible). The further the devices are from each other, the more accurate the readings will be since the small inaccuracies of the antennas will become smaller in relation to the distance apart.

Therefore, from FIG. 1 when the device uses two or more DGNSS antennas to determine Pitch and Yaw in communication with the system computers and/or the device on-board computer processor of the instant invention, the dashed lines are the XYZ coordinate plane.

DGNSS antenna 11—there are two antennas 11

DGNSS antenna 12—there are two antenna 12

A device uses the DGNSS X, Y and Z components of the location of antenna 11

A device uses the DGNSS X, Y and Z components of the location of antenna 12

A device using the system computers and the device on-board computer processor of the instant invention to calculate the line connecting DGNSS antenna 11 and 12 which is item 16 which is determined from trigonometry utilizing the XYZ components of DGNSS antenna 11 and 12. The line is along the Pitch and Yaw of the device. Therefore, when utilizing two or more GNSS antennas, the antennas are mounted to separate areas of the weapon (preferably in line with the barrel and as far apart as possible). The further the devices are from each other, the more accurate the readings will be since the small inaccuracies of the antennas will become smaller in relation to the distance apart.

An advantage of the device of the invention is that it can use more than one distance measurement sensors. Utilizing more than one distance measurement sensor for each device allows the device to determine its orientation (especially Pitch and Yaw) relative to other devices. If another device knows it's absolute (relative to the Earth) pitch and yaw, the absolute Pitch and Yaw of both devices can be calculated.

Figure 2:
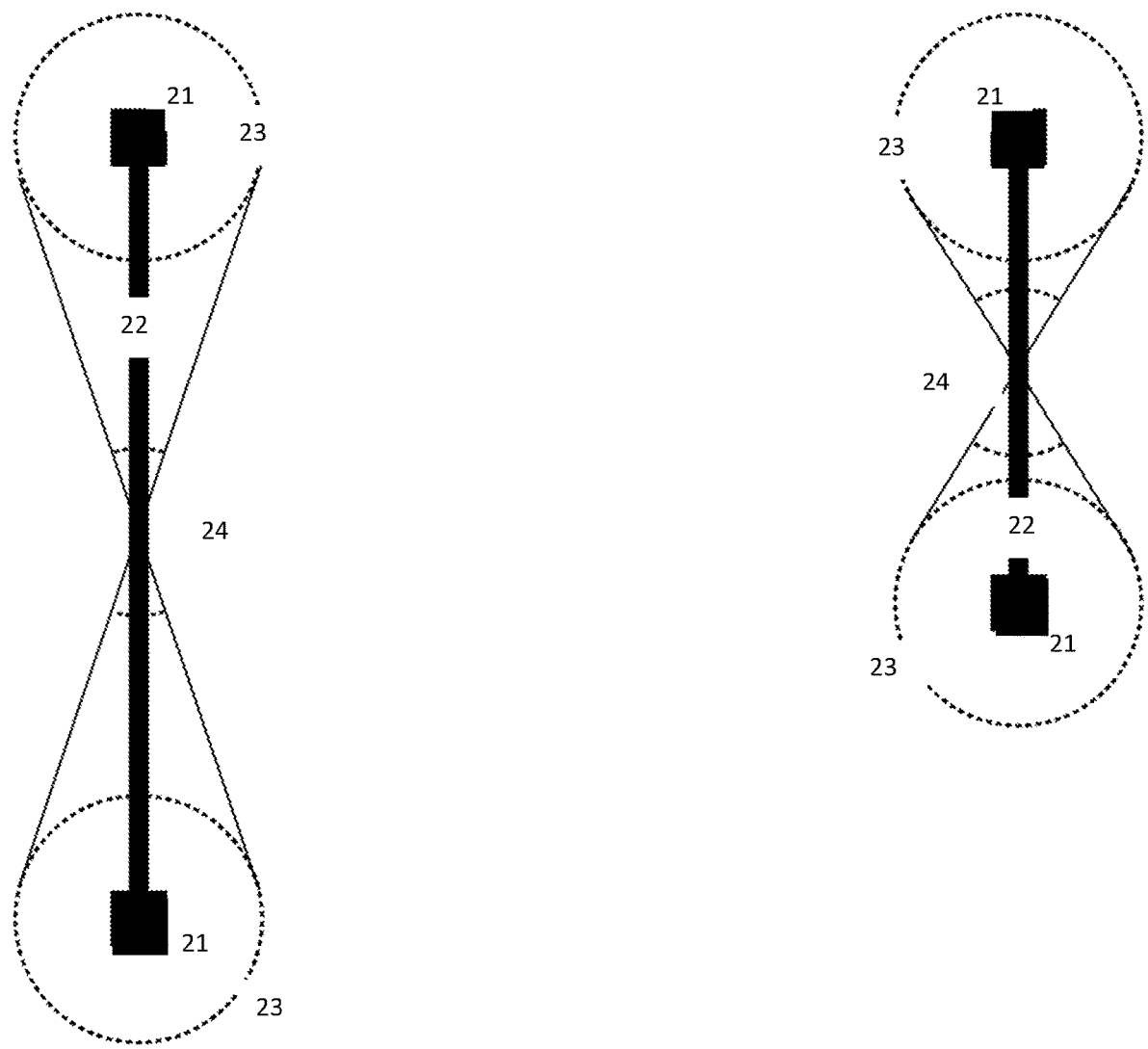
FIG. 2 shows an embodiment when using two GNSS antennas.

Referring now to FIG. 2, which shows an embodiment of the invention using two GNSS antennas attached to a single weapon and device of an embodiment and which results in decrease in expected inaccuracies of orientation by increasing the distance between GNSS antennas. FIG. 2 showing the decrease in expected inaccuracies of orientation by increasing the distance between GNSS antennas 21.

The fixed mounting position when GNSS antennas 21 are mounted on a weapon and attached to the device on-board computer processor of the instant invention is shown by line 22. The position error window is shown as the circle 23 and the orientation error probability is shown as angle 24. A smaller angle shows led error probability, shown by the dotted line.

Figure 3:
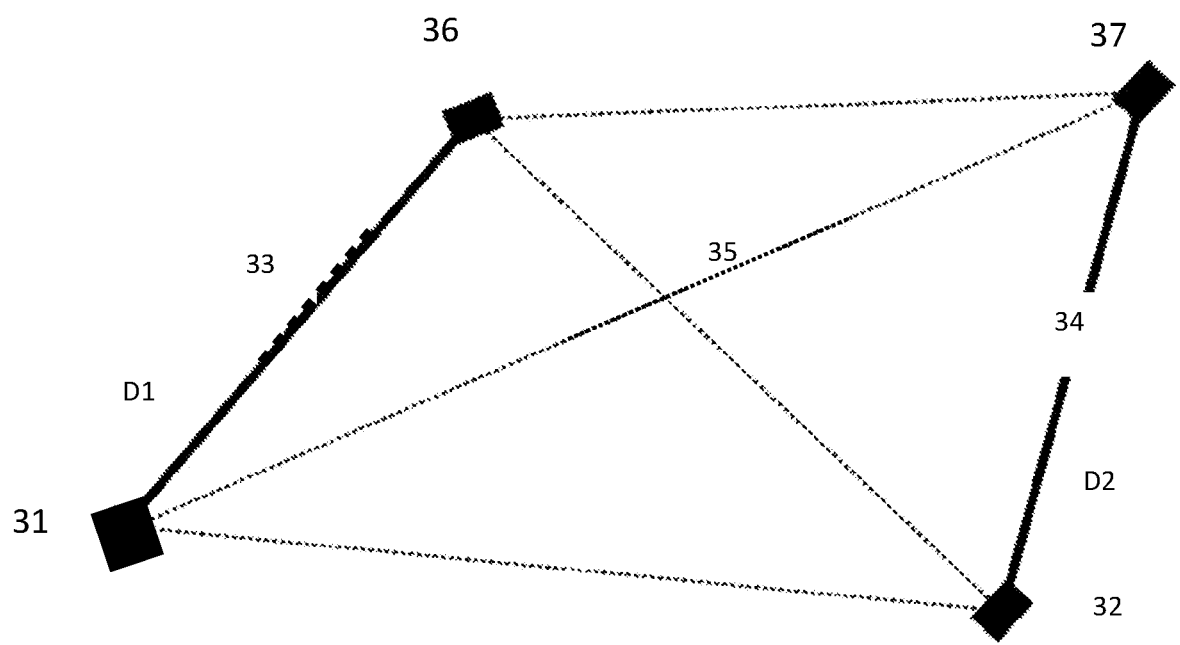
FIG. 3 shows an embodiment used to determine relative positioning utilizing distance sensors.

Referring now to FIG. 3, which shows an embodiment of the invention used to determine the relative positioning utilizing distance sensors in communication with the device on-board computer processor of the instant invention. Each device has two distance sensors mounted on it: device 1 (D1) has sensors 31 and 36, and device 2 (D2) has sensors 32 and 37. The black line 33 and 34 are known distances, since the sensors are fixed to the same weapon or piece of equipment. The sensors measure the distance to other sensors (dotted lines), which make the trigonometric shapes. There is no target in this instance, these sensors only determine orientation between two devices. Later, by knowing the relative orientation of both devices, and the relative location of a target to either device, the relative location of the target compared to the other device is calculated. Therefore, determining relative positioning utilizing distance sensors Distance sensors on device 1 D1 are 31 and 36.

Distance sensors on device 2 D2 are 32 and 37.

Since the sensors are in a fixed position on device 1 (D1), the length of this line is known, line 33.

Since the sensors are in a fixed position on device 2 (D2), the length of this line is known line 34.

These (dashed) lines are determined by the distance sensors. Utilizing trigonometry, the resultant angles and sides give relative location and orientation of the devices.

As noted, earlier atmospherics conditions are external variables that effect the flight path of a bullet and must be compensated for in order to achieve the most accurate ballistic intercept solution. The computer program of the device of the invention in an embodiment collects these atmospheric conditions and applies them to the coordinate calculations to arrive at a target position.

Temperature. Temperature effects the speed of the bullet through air as well as the burn of the gunpowder propelling it. A thermometer can be included to compensate for temperature.

Barometric pressure. The barometric pressure of the air will slow a bullet down to varying rates. This can be measured and compensated for by a barometer.

Wind speed and direction can both slow a bullet down and cause it to change directions. The wind speed and direction can be compensated for by an anemometer.

Temperature, pressure and wind can be directly calculated by sensors in the device, calculated from external sensors paired with the device, or, data on temperature, pressure and wind can be transmitted from external sources (such as military weather teams) to the devices.

Target velocity and direction can also be integrated into calculations to determine the firing target location of a moving target.

These conditions are collected from the various sensors on the device or present on the network, so they can be factored into the solution.

Once a target is sighted in by the operator, the operator will trigger the device to mark the target location. The target location can be marked either for one specific time (i.e. the target is marked once when the operator triggers the device), multiple times, or for a continuous period (the device continues to update the target location as long as the operator triggers it and follows the target).

Triggering the device to mark the target will cause the device to utilize the data it receives from its sensors to determine the target location either absolutely (relative to the earth) or relatively (relative to the device). The device is capable of marking the target by itself when utilizing the devices distance sensors and other sensors. Alternatively, two or more devices can be used to mark a target without the aid of the distance sensors, or to create a more accurate target location.

Utilizing either method, the devices rely on triangulation to find the target location. In trigonometry and geometry, triangulation is the process of determining the location of a point by forming triangles to it from known points. Triangles are made up of 3 sides and 3 angles. Knowing at least 3 of these 6 items (as long as at least 1 is a side) allows the other sides and angles to be known.

The target location can then be broken down into X, Y, and Z components (cartesian coordinates) using the trigonometric Law of Sines. Alternately, the location can be determined as a distance and vector, or other mathematical concepts for showing the location of an object in space. The solution is calculated and fed into the firing display for the shooter to use. The coordinates returned are based on the weapon's/device's position with respect to the target.

Figure 4:
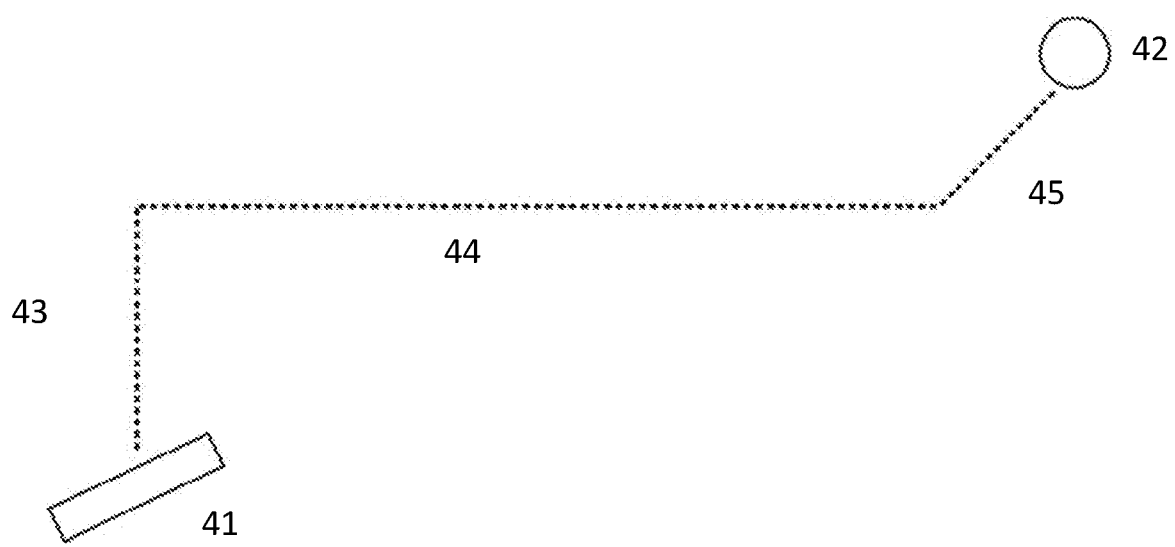
FIG. 4 shows an embodiment with regards to components of range.

Referring now to FIG. 4 shows an embodiment with regards to the components of range.

Device 41 is targeting target 42 which is the Target object.

Looking at the X component 43 of the range to target object which also may be referred to as the North/South component. The feature is defined as parallel to the Prime Meridian and lines of latitude. The Y component 44 of the range to target object also referred to as East/West component is defined as parallel to the Equator and line of longitude. The Z component 45 of the range to target also referenced as height or altitude component is defined as perpendicular to both X and Y components and generally running along a line from the target object to the center of the Earth.

The coordinates once calculated, 43 (X), 44 (Y) and 45 (Z), are communicated via the network to the device 41 and fed into the firing display for the shooter to use to shoot the target 42. The solution is calculated and fed into the firing display for the shooter to use. The coordinates returned are based on the weapon's/device's position with respect to the target.

As noted, earlier atmospheric conditions are external variables that affect the flight path of a bullet and must be compensated for in order to achieve the most accurate ballistic intercept solution. The computer program of the device of collects these atmospheric conditions and applies them to the coordinate calculations to arrive at a target position. If requested by the user, the computer program will provide up to 6 alternative coordinate solutions for a target to account for miscalculations and sensor data irregulates. This provides the user with over, under, and exact calculated location solutions for the target.

Figure 5:
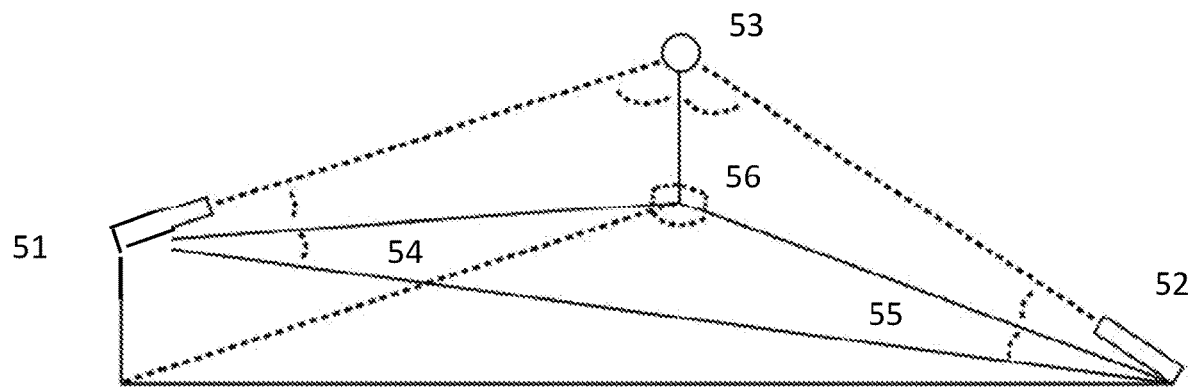
FIG. 5 shows an embodiment used for intersection targeting using two devices.

Referring now to FIG. 5 which shows an embodiment of the invention that is used for intersection targeting using two devices. Device 51 and device 52 are targeting target 53 and an embodiment calculates the coordinates for each device similar to the calculations done in FIG. 4, and communicates unique coordinates 43 (X), 44 (Y) and 45 (Z), and angles 54 and 55 via the network to the device 51 and device 52, and these coordinates and angles are fed into the firing display for the shooters of Devices 51 and 52 to use to shoot the target 42. The solution is calculated and fed into the firing display for the shooter to use. The coordinates returned are based on the weapon's/device's position with respect to the target and the orientation, location, range to target, and rate of change of the data to accurately locate the target in space and determine its velocity relative to the earth and position of the weapon/device.

An The device of the invention will continuously calculate the target position using target 42 position and trajectory, as well as the differences in time between each location. Using this data, the device 51 and 52 can calculate a speed and direction of movement (velocity) of the target.

Once the device 51 and 52 have determined the location either or both devices in absolutely and relative positions, as well as the velocity, if any, of the target 53, the devices 51 and 52 can transmit that data to other devices or other systems on the network. Alternatively, for a target 53 that is marked only once for targeting, that data can be used by the originating device 51 or device 52 as the coordinates and fed into the firing display for the shooter to use to shoot the target 53. The solution is calculated and fed into the firing display for the shooter to use. The coordinates returned are based on the weapons/device position with respect to the target.

As illustrated in FIG. 5, the target velocity and direction can also be integrated into calculations to determine the firing target location of a moving target and the anticipated target position associated with the firing time or the time that the user shoots at the target position 53. This is a replacement for traditional leading of the target to compensate for movement of a moving target. The device utilizes the orientation, location, range to target, and rate of change of the data to accurately locate the target in space and determine its velocity relative to the earth. As noted earlier, if requested by the user the computer program will provide up to 6 alternative coordinate solutions for a target to account for miscalculations and sensor data irregulates. This provides the user with over, under and exact calculated location solutions for the target.

Figure 6:
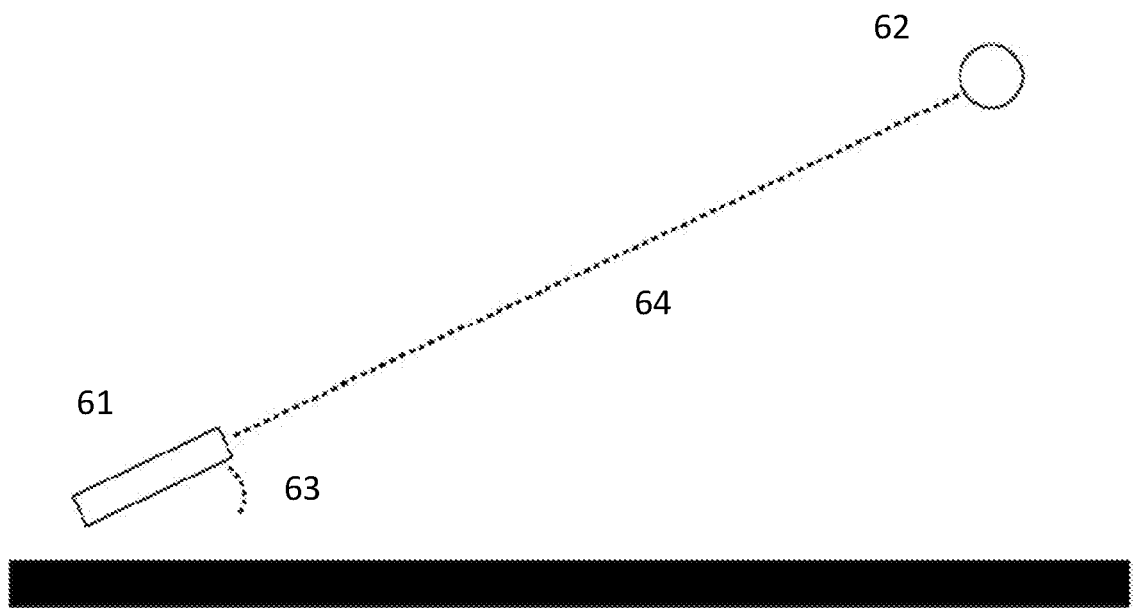
FIG. 6 shows an embodiment used for single device targeting.

Referring now to FIG. 6, which shows a device designed for single device targeting, we have device 61, target object 62, angle of device 63, and measured distance to the target object 64.

If the operator using device 61 triggers the device 61 to track a moving target 62, the device 61 will continuously calculate the target 62 position using the methodology of FIG. 4, as well as the differences in time between each location of target 62. Using this data, the device can calculate a speed and direction of movement (velocity) of the target 62. The device utilizes the orientation, location, range to target, and rate of change of the data to accurately locate the target in space and determine its velocity relative to the earth.

Once the device has determined the location either or both absolutely and relatively, as well as the velocity, if any, of the target 62, the device 61 can transmit that data to other devices or other systems on the network. Alternatively, for target 62 that is marked only once, the data can be used by the originating device and the coordinates and can be fed into the firing display of device 61 for the shooter to use to shoot the target 62. The coordinates returned are based on the weapons/device position with respect to the target.

Figure 7:
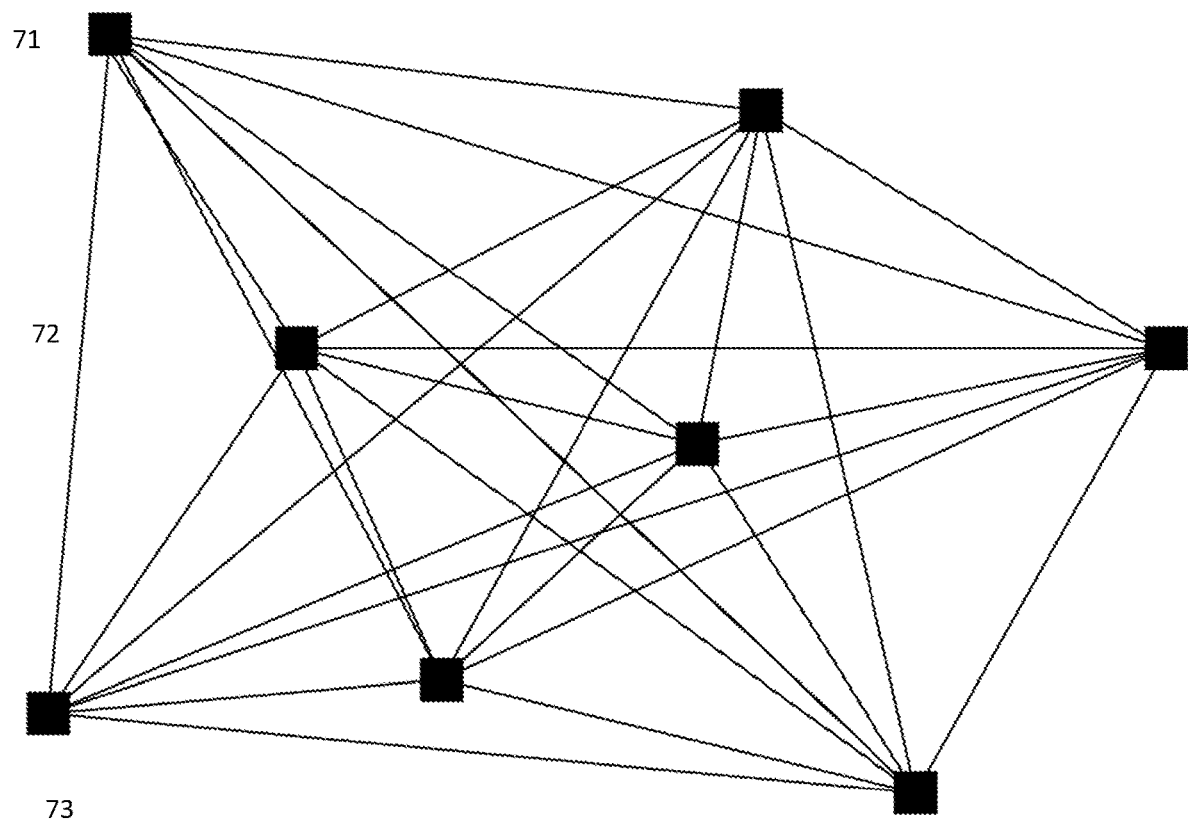
FIG. 7 shows an embodiment using a mesh network for the communication system.

Referring now to FIG. 7, which shows an embodiment using a mesh network for the communication system mapping the data connections between devices. Target data would be sent along these connections. The squares are the devices and devices 71 and 73 are typical devices on the mesh network of an of and embodiment of the invention. Line 72 shows the connection between devices 71 and 73.

Figure 8:
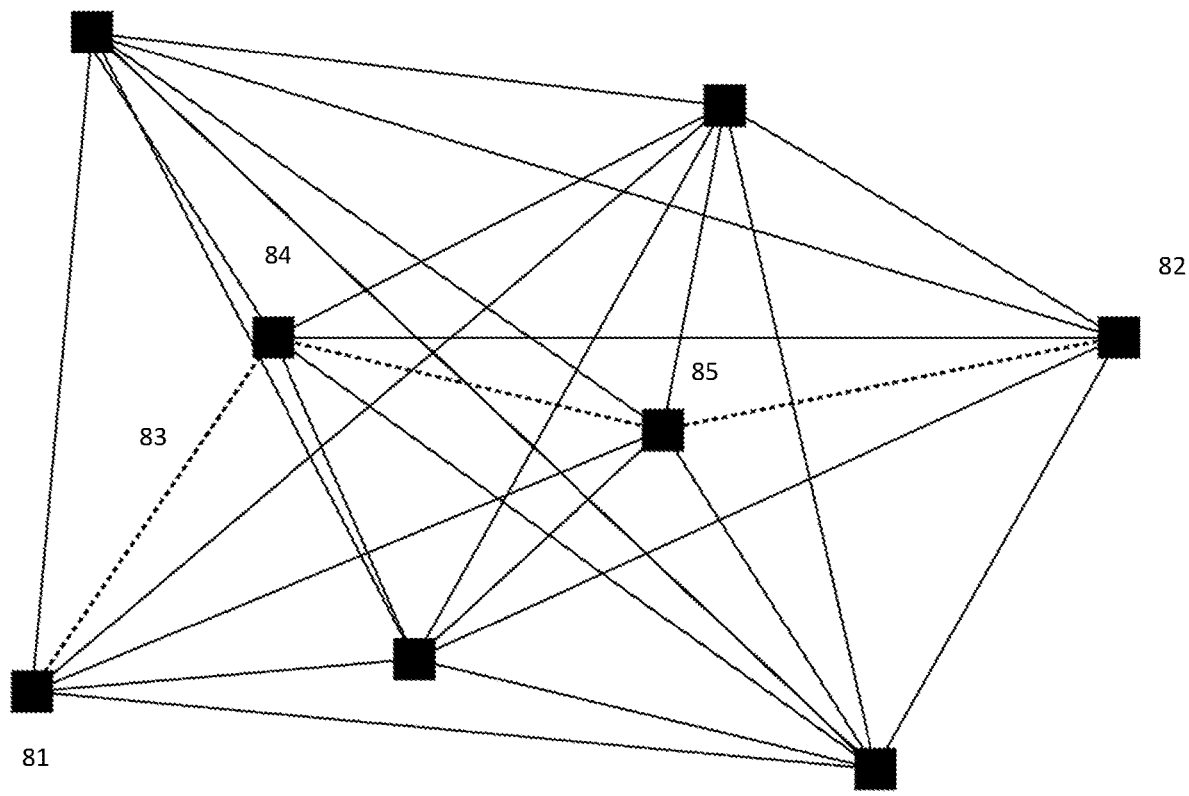
FIG. 8 shows an embodiment using a mesh network with non-direct connection.

Referring now to FIG. 8 which shows an embodiment using a mesh network with non-direct connection when a direct connection is not available. Device 81 and device 82 are typical devices on the mesh network. The data flow through other devices by way of repeaters, with no direct connection, is shown by dotted line 83, and it relays information through devices 84 and 85 to feed information to device 82.

The device also communicates with other aspects of the invention such as the base station. The base station serves as a node for information into and out of the network from external sources. The base station creates and broadcasts Real Time Correction Measures (RTCM) data, as well as other targeting data, atmospheric data, software updates, and others. The device is capable of sending any data to an external source through the base station. The base station rebroadcasts this data via either wired or wireless connections to other types of systems in use by the user, such as military computers, storage networks, or radio systems. The base station is also capable of modifying data both coming in and leaving in order to properly communicate to the device or external systems.

Figure 9:
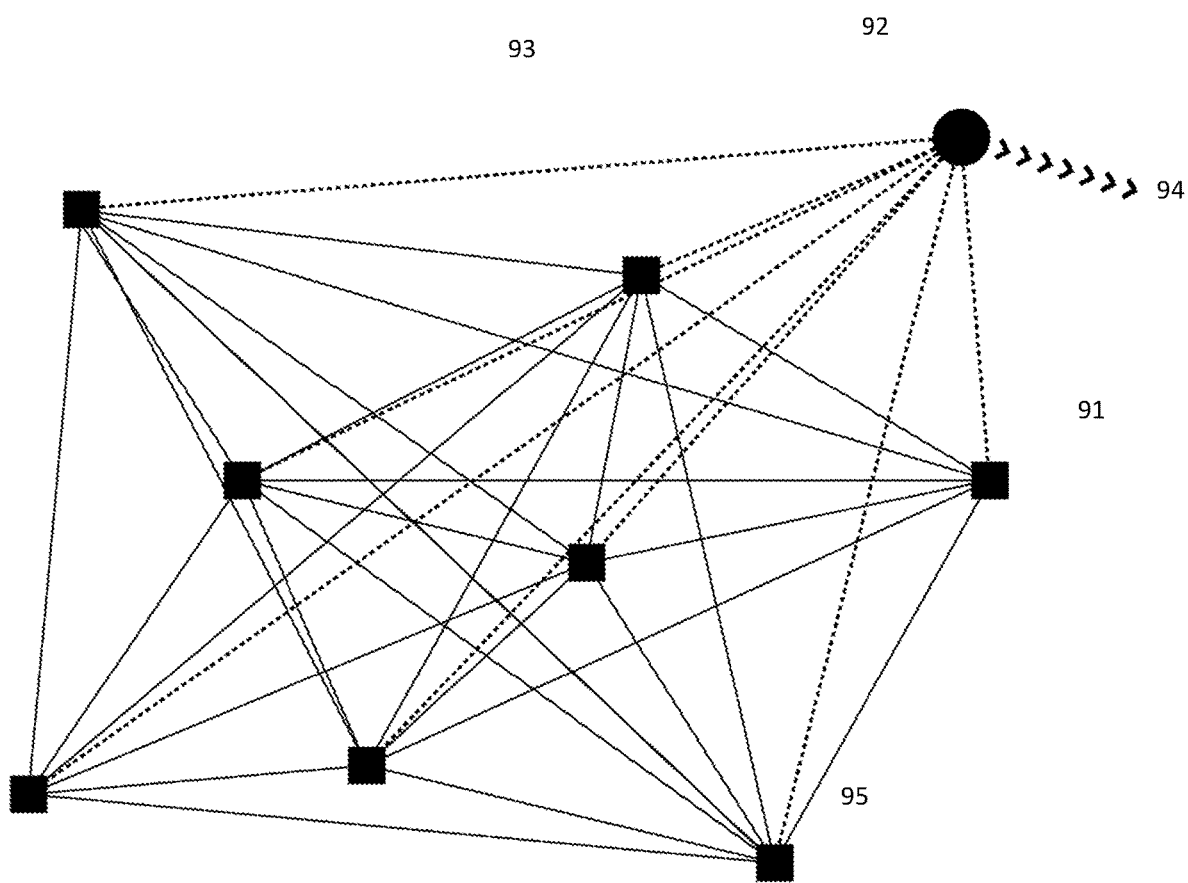
FIG. 9 shows an embodiment using a mesh network with a connection to an external system.

Referring now to FIG. 9 which shows an embodiment using a mesh network with a connection to an external system. FIG. 9 shows the Mesh networked devices 91 and 95 which are typical devices used by the embodiment, Base station device 92, Connections between base station and mesh networked device 93 and Connection to external systems 94. The network can communicate with more than one external system.

Devices of the invention can connect to one or more base stations at any time. Base stations can communicate with multiple mesh networks at any given time.

The base station can be a separate device or built into other network devices of the mesh networked such as devices 91 and 95.

The base station can also be connected with users or placed remotely using the external connection 94.

The device of the embodiment can utilize targeting data provided by external systems, as long as the data includes target location at a minimum.

The device of the invention uses the targeting data, as well as the device's location and velocity data, atmospherics, and weapon specific data to determine where the attached weapon needs to point in order to have effects on the target.

The system of the invention computes the flight time, drop due to gravity, and side motion of the bullets. This information is then used by the device to determine how the weapon should point so that the bullet when fired will hit the target. The information can be provided to the originating device or provided over the network for use by other connected devices.

Once the device of the invention computes the needed values (orientation) for hitting the target, it compares the present orientation to the needed. This difference is how the operator must move the weapon. The device displays this difference graphically on a screen or other interface for use by the shooter to shoot the target.

The device of the invention will show the shooter when they are getting closer and on target, and will also give users the command to fire as well as other commands.

The system may also compute multiple points of aim to hit a target that is moving, or from a moving device, or both.

Figure 10:
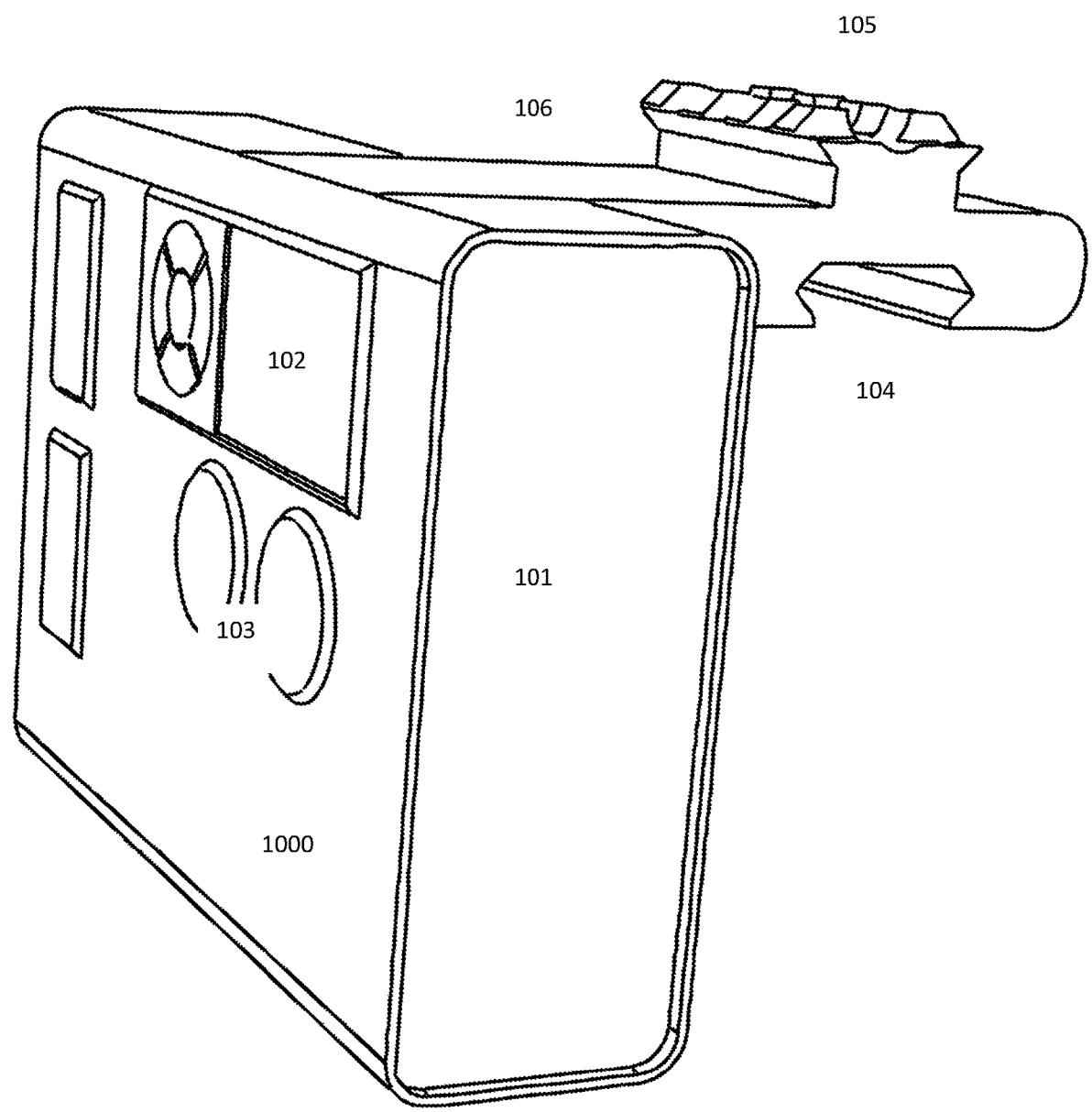
FIG. 10 shows a schematic of an embodiment of the invention showing major components (rear quarter, facing user)

Referring now to FIG. 10 which shows the device 1000 which is one embodiment of the invention and schematically showing major components (rear quarter, facing user). The primary user interface 101 used primarily for targeting. Item 102 is the secondary user interface used for device setup, Item 103 is the control button used by the user to interface with primary user interface 101 and secondary user interface 102 for inputting information into the device 1000.

Item 104 is the common mounting rail for mounting device to weapon and item 105 is a common mounting rail for mounting accessories. Item 106 is a detachable mounting rail component.

Figure 11:
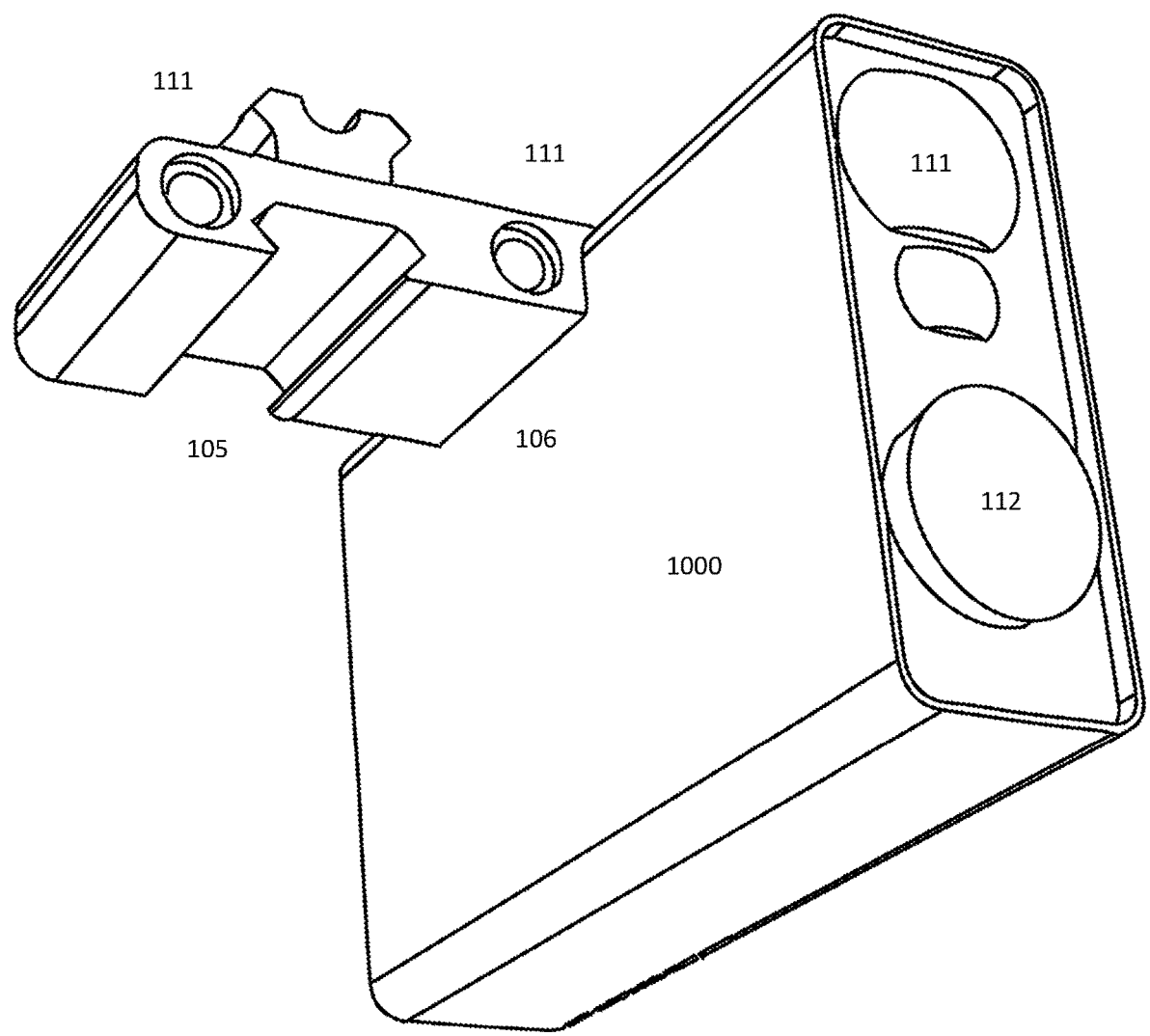
FIG. 11 shows a schematic of an embodiment of the invention showing the front quarter (facing towards target)

Referring now to FIG. 11 which shows the device 1000 which is one embodiment of the invention and schematically showing the front quarter (facing towards target). The Sensors and cameras are shown as item 111, the power and battery lid cover item 112, the common mounting rail item 105 and the detachable mounting rail component item 106.

Figure 12:
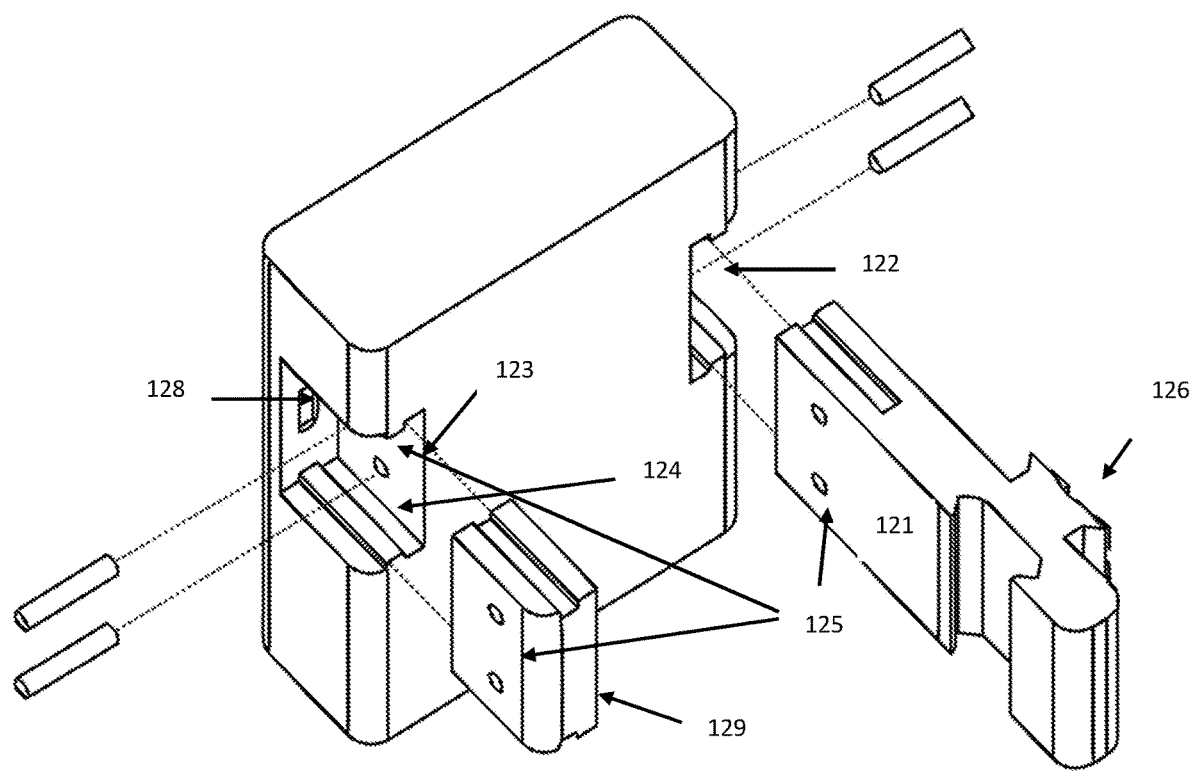
FIG. 12 shows an embodiment with a mount for a Picatinny or similar rail system.

Referring now to FIG. 12 the device is generally designed to mount to a Picatinny or similar rail system, common on military and other firearms. Due to the device design and use, the standard mounting may not always be the most useful. Certain weapons systems are of different shapes, have rails in locations that aren't useful, lack rails at all or are otherwise not capable of mounting the device in the standard configuration.

The device is designed such that the mounting bracket 121 is able to be removed from its mounting location 122 and moved to another mounting location 123 such as on the bottom of the device. This would change how the device sits relative to a weapon.

The mounting bracket 121 can alternately be switched for another mounting bracket, such as one designed to mate to non-Picatinny rail systems, or for specific weapons systems requiring a unique mount such as a mortar. The mounting rails all have common components where the bracket meets the device such as mounting rails 124 and/or holes for screws 125. These ensure a secure connection between the device and any mounting bracket, as well as easy interoperability for the user.

The mounting bracket 121 can, in addition to mounting the device to a weapon, serve other purposes. The bracket can include additional mounting rails 126 for optics or other systems. In addition, the mounting bracket may contain sensors utilized by the device such as cameras, electromechanical sensors, antennas, radios or others.

The mounting bracket 121 is secured to the device with a combination of the mounting rails 124 and screws 126 or similar user removable parts.

The mounting bracket 121 fits into a cavity in the device 122 & 123. This strengthens the mount and protects a wiring connection 128 between the device and the mounting bracket 121. The wiring connection can supply or receive power and information between the device and the mounting bracket 121.

When not used for the mounting bracket 121, any cavities may be filled with a plug 129. This plug keeps the connections clear from dirt and dust. The plug may also contain batteries, sensors, or other electronic components which aid in the device's functioning. The plug 129 could also be used to enhance the features of the device, for instance having a wired connection to an external power supply or data supply.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A computer system for determining target coordinates of a target comprising:

at least one weapon-mounted device attached to at least one weapon, the weapon having a present orientation, used by at least one user to shoot the target;

said weapon-mounted device having an on-board computer processor having a computer program to calculate the target coordinates;

said weapon-mounted device having a display connected to said on-board computer processor for displaying the target coordinates of the target;

said weapon-mounted device having a user interface;

said weapon-mounted device having a plurality of sensors that are in communication with said on-board computer processor;

at least one of said plurality of sensors being a location sensor;

at least one of said plurality of sensors being an orientation sensor;

at least one of said plurality of sensors being an atmospheric conditions sensor;

at least one of said plurality of sensors being a position sensor;

at least one of said plurality of sensors being a speed and direction sensor;

said program on said on-board computer processor calculating and displaying the target coordinates of the target on said display to the user;

the coordinates comprising of distance, x, y and z coordinates and angles to provide a vector for aiming said at least one weapon at the target;

said program on said on-board computer processor comparing the present orientation to said vector and displaying the difference on said display.

2. The computer system of claim wherein said user interface is selected from the group consisting of a video display, an indicator light panel, and a voice command system.

3. The computer system of claim 1, wherein said location sensor is selected from the group consisting of Differential Global Navigation Satellite Systems, out-and-back radio systems, Light Detection and Ranging (LIDAR), and ultrasonic and optical Stadia distance measurement.

4. The computer system of claim 1, wherein said orientation sensor is selected from the group consisting of Magnetometer, Gyroscope, Accelerometer and Differential Global Navigation Satellite Systems.

5. The computer system of claim 1, wherein said atmospheric conditions sensor is selected from the group consisting of thermistor, thermocouple, semiconductor-based temperature sensor, thermal anemometer, Light Detection and Ranging (Lidar), cup anemometers, vane sensors with potentiometer, and vane anemometer.

6. The computer system of claim 1, wherein said position sensor is selected from the group consisting of out-and-back radio systems, Light Detection and Ranging (LIDAR), and ultrasonic and optical Stadia distance measurement.

7. The computer system of claim 1, wherein said speed and direction sensor is selected from the group consisting of out-and-back radio systems, Light Detection and Ranging (LIDAR), and ultrasonic and optical Stadia distance measurement.

8. The computer system of claim 1, wherein said program on said on-board computer processor uses information from said plurality of sensors to calculate the x, y and z coordinates and angle with respect to said weapon-mounted device.

9. A system for determining target coordinates of a target comprising:

a plurality of weapon-mounted devices each respectively attached to one of a plurality of weapons each used, respectively, by one of a plurality of users to shoot the target;

said plurality of weapon-mounted devices being disposed in wireless communication with each other and with at least one base station by way of a mesh network;

said network capable of communication with at least one external system;

each of said plurality of weapon-mounted devices having an on-board computer processor having a computer program to calculate the target coordinates;

each of said plurality of weapon-mounted devices having a display connected to said processor for displaying said target coordinates of the target;

each of said plurality of weapon-mounted devices having a user interface;

each of said plurality of weapon-mounted devices having a plurality of sensors that are in communication with said on-board computer processor;

at least one of said plurality of sensors being a location sensor;

at least one of said plurality of sensors being an orientation sensor;

at least one of said plurality of sensors being an atmospheric conditions sensor;

at least one of said plurality of sensors being a position sensor;

at least one of said plurality of sensors being a speed and direction sensor;

said computer program on said on-board computer processor calculating and displaying the target coordinates of the target on said display to the user; and the coordinates comprising distance, x, y and z coordinates and angles to provide the vector for aiming said at least one weapon at the target.

10. The system of claim 9, wherein said user interface is selected from the group of input devices consisting of video display, an indicator light panel, and a voice command system.

11. The computer system of claim 9, wherein said location sensor is selected from the group consisting of Differential Global Navigation Satellite Systems, out-and-back radio systems, Light Detection and Ranging (LIDAR), ultrasonic and optical Stadia distance measurement.

12. The system of claim 9, wherein said orientation sensors is selected from the group consisting of Magnetometer, Gyroscope, Accelerometer and Differential Global Navigation Satellite Systems.

13. The system of claim 9, wherein said atmospheric conditions sensor is selected from the group consisting of thermistor, thermocouple, semiconductor-based temperature sensor, thermal anemometer, Light Detection and Ranging (Lidar), cup anemometers, vane sensors with potentiometer, and vane anemometer.

14. The system of claim 9, wherein said position sensor is selected from the group consisting of out-and-back radio systems, Light Detection and Ranging (LIDAR), ultrasonic and optical Stadia distance measurement.

15. The system of claim 9, wherein said speed and direction sensor is selected from the group consisting of out-and-back radio systems, Light Detection and Ranging (LIDAR), ultrasonic and optical Stadia distance measurement.

16. The system of claim 9, wherein program on said on-board computer processor, uses information from said plurality of sensors to calculate the x, y and z coordinates and angle with respect to said weapon-mounted device.

17. The system of claim 9, wherein said mesh network is selected from the group consisting of Zigbee, Thread, Bluetooth mesh, Z-Wave, Bluetooth networks and WIFI networks.

\* \* \* \* \*